(12) United States Patent
Shibasaki (10) Patent No.: US 8,500,289 B2
(45) Date of Patent: Aug. 6, 2013

(54) LIGHT SOURCE UNIT INCLUDING A LUMINESCENT WHEEL THAT PERFORMS CONTROL TO ROTATE OR STOP THE WHEEL WHILE LIGHT IS EMITTED ONTO IT AND PROJECTOR

(75) Inventor: Mamoru Shibasaki, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 75 days.

(21) Appl. No.: 13/076,669

(22) Filed: Mar. 31, 2011

(65) Prior Publication Data

US 2011/0242502 A1 Oct. 6, 2011

(30) Foreign Application Priority Data

Mar. 31, 2010 (JP) ................................. 2010-082695

(51) Int. Cl.
*G03B 21/14* (2006.01)
*G03B 21/20* (2006.01)
*H04N 9/12* (2006.01)
*H04N 5/72* (2006.01)

(52) U.S. Cl.
USPC ................. 353/84; 353/85; 353/31; 348/743; 348/835

(58) Field of Classification Search
USPC ................. 353/84, 85, 31; 348/743, 835
See application file for complete search history.

(56) References Cited

U.S. PATENT DOCUMENTS

| 2009/0284148 A1 | 11/2009 | Iwanaga |
| 2010/0238412 A1* | 9/2010 | Kurosaki .................... 353/31 |
| 2011/0096297 A1 | 4/2011 | Ogino et al. |

FOREIGN PATENT DOCUMENTS

| JP | 2002-333671 A | 11/2002 |
| JP | 2004-341105 A | 12/2004 |
| JP | 2006-154002 A | 6/2006 |
| JP | 2006-235317 A | 9/2006 |
| JP | 2008-181044 A | 8/2008 |
| JP | 2009-085977 A | 4/2009 |
| JP | 2009-277516 A | 11/2009 |
| JP | 2010-217566 A | 9/2010 |
| JP | 2011-095388 A | 5/2011 |

* cited by examiner

*Primary Examiner* — Georgia Y Epps
*Assistant Examiner* — Magda Cruz
(74) *Attorney, Agent, or Firm* — Holtz, Holtz, Goodman & Chick, P.C.

(57) ABSTRACT

A projector is provided which can reduce power consumption while preventing the deterioration of a luminescent material by heat by controlling a luminescent wheel to rotate or stop rotating. The projector of the invention includes a light source unit having an excitation light source, a luminescent wheel on which a luminescent material layer is laid circumferentially which becomes luminous using light emitted from the excitation light source as excitation light and a wheel motor for driving the luminescent wheel, a display device, a light guiding optical system which guides light emitted from the light source unit to the display device, a projection side optical system which projects projection light generated in the display device, and a motor control part which determines whether to stop or drive the wheel motor in such a state that excitation light is shone on to the luminescent material layer by the excitation light source.

12 Claims, 4 Drawing Sheets

LIGHT SOURCE UNIT INCLUDING A LUMINESCENT WHEEL THAT PERFORMS CONTROL TO ROTATE OR STOP THE WHEEL WHILE LIGHT IS EMITTED ONTO IT AND PROJECTOR

CROSS-REFERENCE TO RELATED APPLICATIONS

This application is based upon and claims the benefit of priority under 35 USC 119 of Japanese Patent Application No. 2010-82695 filed on Mar. 31, 2010, the entire disclosure of which, including the description, claims, drawings and abstract thereof, is incorporated herein by reference.

BACKGROUND OF THE INVENTION

1. Field of the Invention

The present invention relates to a light source unit and a projector which includes this light source unit.

2. Description of the Related Art

In these days, data projectors are used on many occasions as image projection apparatuses which project images including images of screens and video images of personal computers, as well as images based on image data which is stored in memory cards on to a screen.

In projectors of the type described above, conventionally, projectors using a high-intensity discharge lamp as a light source have been the mainstream of projectors. However, in recent years, there have been made many developments and proposals on projectors which use, as a light emitting element of a light source, a light emitting diode (LED), a laser beam emitter, a device utilizing organic EL technology or luminescent materials.

For example, Japanese Unexamined Patent Publication No. 2004-341105 (JP-A-2004-341105) proposes a light source unit in which a red luminescent material layer, a green luminescent material layer and a blue luminescent material layer are provided circumferentially in an end-to-end fashion on a front surface of a luminescent wheel made up of a disc having light transmission characteristics and a dichroic filter which transmits ultraviolet light and reflects visible light is disposed on a rear surface of the luminescent wheel, so that light source light of red, green and blue wavelength bands is generated by shining ultraviolet light on to the luminescent material layers from the rear surface of the luminescent wheel.

In addition, the applicant of this patent application also proposed in the previous patent application a light source unit which includes a laser beam emitter as an excitation light source and a luminescent wheel on which a luminescent layer is formed on a reflecting surface.

In this proposal, a laser beam is shone on to the luminescent material layer from the laser beam emitter and luminescent luminous light which is emitted from a luminescent material in the luminescent material layer is made use of as light source light by being extracted from a surface on the same side as the surface on to which the laser beam is shone.

SUMMARY OF THE INVENTION

As has been described above, there are projectors in which luminescent luminous light is used as light source light which is emitted from a luminescent material in a luminescent material layer by shining light from an excitation light source on to the luminescent material layer.

In these projectors, although the amount of luminescent luminous light emitted from the luminescent material can be increased by increasing the output of the excitation light source, when the output of the excitation light source is increased, there has been caused a fear that the luminescent material is heated and the amount of luminescent luminous light emitted therefrom is reduced or that the luminescent material is deteriorated by heat or damaged by burning.

To cope with this problem, there is proposed a method for preventing the deterioration or damage of a luminescent wheel on which a luminescent material layer is laid circumferentially which would otherwise be caused by the luminescent material being heated or burned due to a local concentration of excitation light by changing the position on the luminescent material layer where excitation light is shone by rotating the luminescent wheel.

However, when the luminescent wheel is rotated at all times, there has been caused a problem that power consumption is increased due to a wheel motor being driven at all times.

The invention has been made in view of the problems inherent in the related art, and an object thereof is to provide a light source unit comprising an excitation light source and a luminescent wheel on which a luminescent material layer is laid, wherein power consumption can be reduced while preventing the deterioration by heat or damage by burning of a luminescent material by controlling the luminescent wheel to rotate or stop.

In addition, the other object of the invention is to provide a projector which can reduce power consumption during projection by including the light source unit according to the invention.

According to a first aspect of the invention, there is provided a light source unit comprising an excitation light source, a luminescent wheel on which a luminescent material layer is laid circumferentially which becomes luminous by using light emitted from the excitation light source as excitation light, a wheel motor for driving the luminescent wheel and a motor control part which determines whether to stop or drive the wheel motor with excitation light shone on to the luminescent material layer by the excitation light source.

According to a second aspect of the invention, there is provided a projector comprising a light source unit having an excitation light source, a luminescent wheel on which a luminescent material layer is laid circumferentially which becomes luminous by using light emitted from the excitation light source as excitation light and a wheel motor for driving the luminescent wheel, a display device, a light guiding optical system for guiding light emitted from the light source unit to the display device, a projection side optical system for projecting projection light generated in the display device and a motor control part for determining whether to stop or drive the wheel motor with excitation light shone on to the luminescent material layer by the excitation light source.

DETAILED DESCRIPTION OF THE PREFERRED EMBODIMENT

Hereinafter, a preferred mode for carrying out the invention will be described by use of the accompanying drawings.

Figure 1:
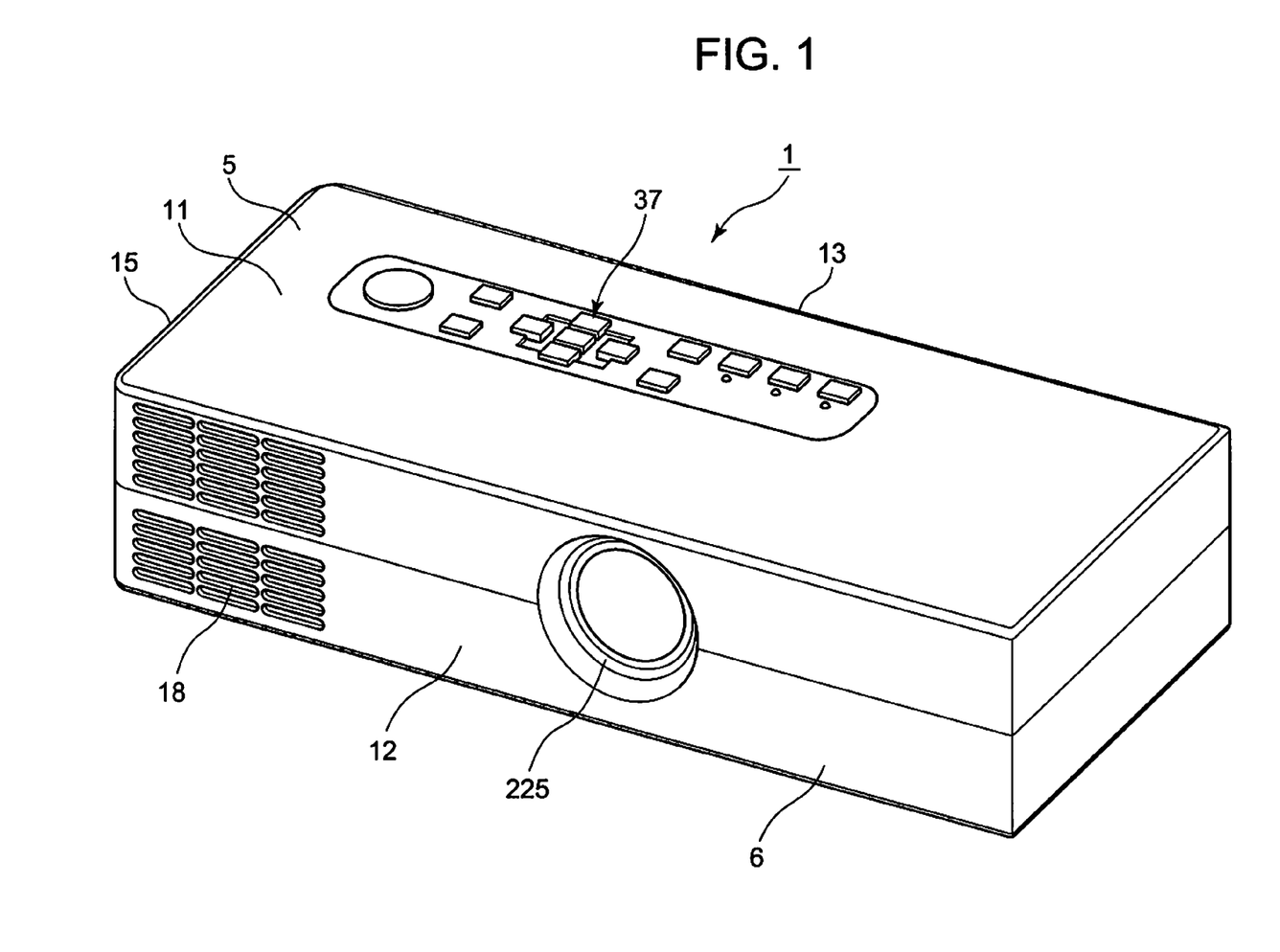
FIG. 1 is a perspective view showing an external appearance of a projector according to an embodiment of the invention.

FIG. 1 is a perspective view showing an external appearance of a projector.

In this embodiment, when the left and right of a projector 1 are described, leftward and rightward directions with respect to a projecting direction of the projector 1 are meant, and when the front and rear of the projector 1 are described, forward and rearward directions with respect to the projecting direction of the projector 1 and a traveling direction of a light beam are meant.

As is shown in FIG. 1, a projector 1 is a small projector 1 which has a substantially rectangular parallelepiped geometry and which is so small as to be placed on the inner surface of the hand. The projector 1 includes an upper case 5 and a lower case 6 which are made to cover an interior of the projector 1.

When the upper case 5 and the lower case 6 are fitted together, a front panel 12 is provided which is positioned at a front of a projector housing. A lens barrel 225 is disposed substantially at the center of the front panel 12, and slit-like outside air inlet holes 18 are formed in a portion of the front panel 12 which lies in proximity to a right-hand side panel 15 of the projector housing.

A keys/indicators part 37 is provided on an upper panel 11 which is formed by the upper case 5 of the projector housing. Disposed on this keys/indicators part 37 are keys and indicators which include a power supply switch key, a power indicator which informs whether the power supply is on or off, a projection switch key which switches on or off projection, an overheat indicator which informs of an overheat condition when a light source unit, a display device or a control circuit overheats.

Further, provided on a back panel 13 and the right-hand side panel 15 of the projector housing which are provided when the upper case 5 and the lower case 6 are fitted together are various types of terminals including USB terminals, a power supply adaptor plug and a memory card insertion port.

Next, an internal construction of the projector 1 will be described.

Figure 2:
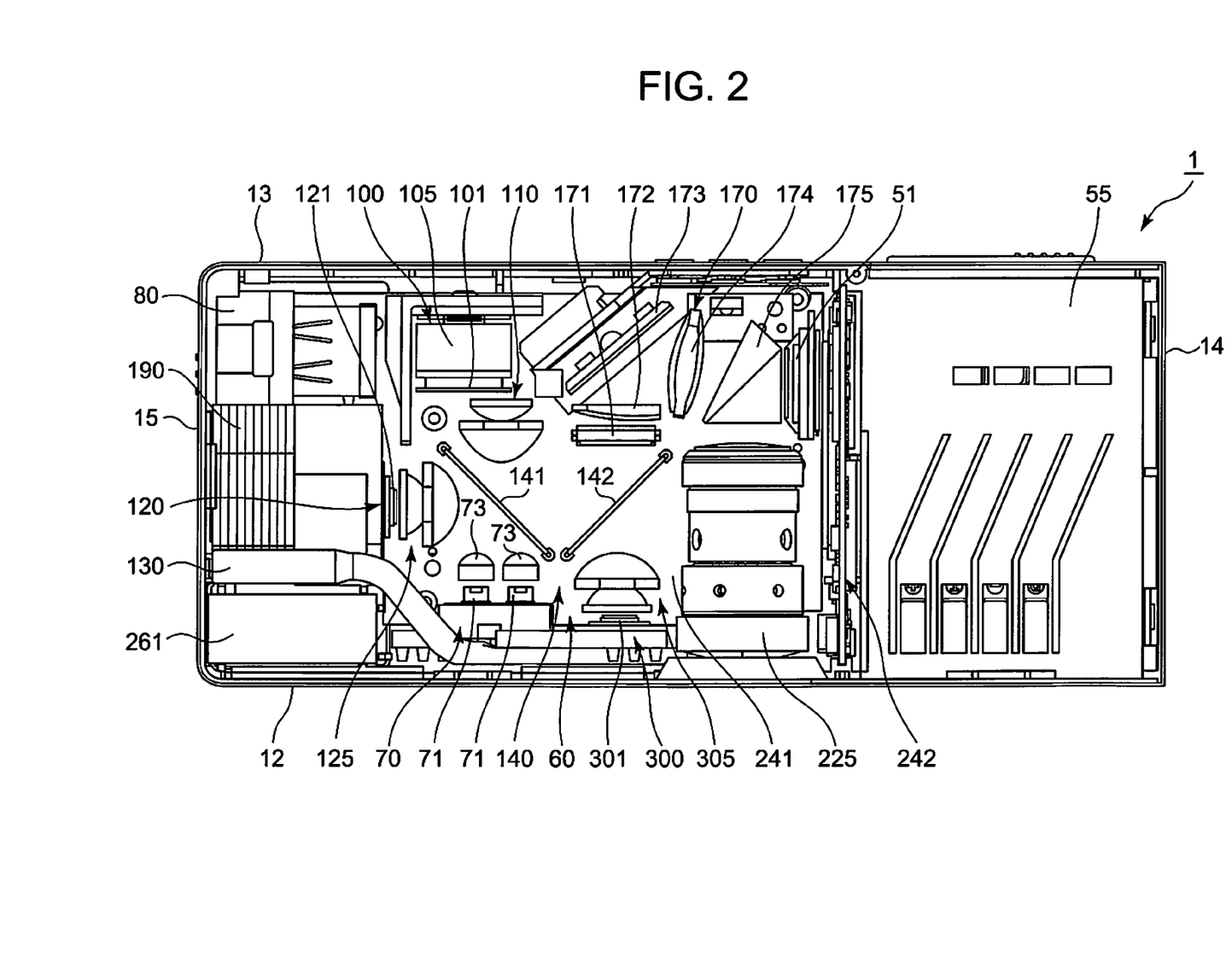
FIG. 2 is a plan view showing an internal construction of the projector according to the embodiment of the invention with an upper cover removed.

FIG. 2 is an exemplary plan view showing an internal construction of the projector 1.

As is shown in FIG. 2, the projector 1 includes a light source unit 60, a lens barrel 225 and a battery 55. The light source unit 60 is positioned in a center of the projector 1. The lens barrel 225 is disposed to the left of the light source unit 60 and incorporates a projection side optical system. The battery 55 is disposed between the lens barrel 225 and a left-hand side panel 14 of the projector housing.

The projector 1 also includes a display device 51 such as a DMD, which is disposed parallel to the left-hand side panel 14 between the lens barrel 225 and the back panel 13 and in proximity to the battery 55.

The projector 1 includes further a main control circuit board 241 below the light source unit 60 and a power supply control circuit board 242 between the lens barrel 225 and the battery 55.

The projector 1 includes a light guiding optical system 170 between the light source unit 60 and the lens barrel 225 and the back panel 13. This light guiding optical system 170 shines light emitted from the light source unit 60 on to the display device 51 and causes an optical axis of on light which is reflected on the display device 51 to coincide with an optical axis of the projection side optical system so as to emit the on light towards the projection side optical system.

In addition, provided sequentially between the light source unit 60 and the right-hand side panel 15 are a power supply connector 80, a heatsink 190 for a red light source 121, which will be described later, a heatsink 130 for an excitation light source 71 and a blue light source 301, which will both be described later, and a cooling fan 261 in that order as viewed from the back panel 13 side.

The light source unit 60 includes an excitation light shining device 70, a blue light source device 300, a luminescent luminous light emitting device 100, a red light source device 120 and a light source side optical system 140 for guiding light of red, green and blue wavelength bands which is emitted from the light source unit 60 to the light guiding optical system 170. The excitation light shining device 70 is disposed in proximity to the cooling fan 261 and also in proximity to the front panel 12. The blue light source device 300 is disposed between the excitation light shining device 70 and the lens barrel 225. The luminescent luminous light emitting device 100 is disposed in proximity to the power supply connector 80 and also in proximity to the back panel 13. The red light source device 120 is disposed between the excitation light shining device 70 and the luminescent luminous light emitting device 100.

The excitation light shining device 70 includes two excitation light sources 71 of which optical axes are parallel to the left-hand side panel 14 and collimator lenses 73 which are disposed on optical axes of the corresponding excitation light sources 71.

These excitation light sources 71 are blue laser beam emitters, which emit a laser beam of blue wavelength band towards the luminescent luminous light emitting device 100.

These excitation light sources 71 are brought into contact with the heatsink 130 via a substrate for the excitation light sources 71 and are then cooled by this heatsink 130.

The luminescent luminous light emitting device 100 includes a luminescent wheel 101 on which a green luminescent material layer is laid circumferentially and a wheel motor 105 for rotationally driving the luminescent wheel 101.

A surface of the luminescent wheel 100 is mirror finished, and the annular green luminescent material layer is laid circumferentially on the mirror-finished surface.

The green luminescent material layer is formed by a binder of a silicone resin having high heat resistance and light transmission properties and a green luminescent material which is dispersed uniformly in the binder.

This green luminous material layer emits green luminescent luminous light by using laser beams emitted from the excitation light sources 71 as excitation light from the same surface as the surface on which the excitation light is incident.

The wheel motor 105 is controlled by a motor control part, which will be described later, and rotates or stops the rotation of the luminescent wheel 101 in accordance with an indication given thereto from the motor control part.

A detailed description of motor control in the luminescent luminous light emitting device 100 will be made later.

The red light source device 120 includes a red light source 121 of which an optical axis is parallel to the front panel 12.

This red light source 121 is a red light emitting diode and is cooled by the heatsink 190.

The blue light source device 300 includes a blue light source 301 of which an optical axis is parallel to the excitation light sources 71.

This blue light source 301 is a blue light emitting diode and is cooled by the heatsink 130.

The light source side optical system 140 includes a collective lens 110, a collective lens 125, a collective lens 305, a first dichroic mirror 141 and a second dichroic mirror 142. The collective lens 110 collects light emitted from the excitation light shining device 70 and luminescent luminous light from the luminescent wheel 101. The collective lens 125 collects light emitted from the red light source 121. The collective lens 305 collects light emitted from the blue light source 301. The first dichroic mirror 141 transmits light emitted from the excitation light shining device 70 and the red light source device 120 and reflects luminescent luminous light from the luminescent luminous light emitting device 100. The second dichroic mirror 142 reflects light emitted from the red light source device 120 and luminescent luminous light from the luminescent luminous light emitting device 100 and transmits light emitted from the blue light source device 300.

The collective lenses 110, 125, 305 are each configured into a single collective lens system by combination of a plurality of lenses.

The first dichroic mirror 141 is disposed in a position where an optical axis of the excitation light shining device 70 (or the luminescent luminous light emitting device 100) intersects an optical axis of the red light source device 120.

The second dichroic mirror 142 is disposed in a position where the optical axis of the red light source device 120 intersects an optical axis of the blue light source device 300.

In the light source unit 60 configured in the way described above, light source light of red wavelength band is generated by the red light source 121, light source light of green wavelength band is generated by the luminescent wheel 101 which becomes luminous by using light emitted from the excitation light shining device 70 as excitation light, and light source light of blue wavelength band is generated by the blue light source 301.

Light of red, green and blue wavelength bands so generated is then shone on to a microlens array 171 of the light guiding optical system 170 by the light source side optical system 140.

The light guiding optical system 170 includes the microlens array 171, an optical axis alteration mirror 173 for altering the optical axis of each light emitted from the light source unit 60 so as to be directed towards the display device 51, a collective lens 172 which is disposed between the optical axis alteration mirror 173 and the microlens array 171, a collective lens 174 which is positioned on the optical axis changed by the optical axis alteration mirror 173 and a prism 175.

The microlens array 171 converts a pencil of light rays emitted from the light source unit 60 which has a substantially circular section into a pencil of light rays having a rectangular section which matches the shape of the display device 51.

The prism 175 functions not only as a condenser lens which shines light source light to the display device 51 but also an optical axis alteration device which alters an optical axis of projection light generated in the display device 51 so as to coincide with an optical axis of the projection side optical system incorporated in the lens barrel 225.

The projection side optical system incorporated in the lens barrel 225 includes a fixed lens group and a movable lens group.

The battery 55 is a driving power supply for the projector 1 and is a secondary battery which can be charged by being connected to a commercial power supply.

A lithium ion battery, a nickel hydrogen battery or the like can be applied to the battery 55.

Since the projector 1 of the embodiment can project an image by electric power of this battery, no electric cord has to be connected thereto.

Figure 3:
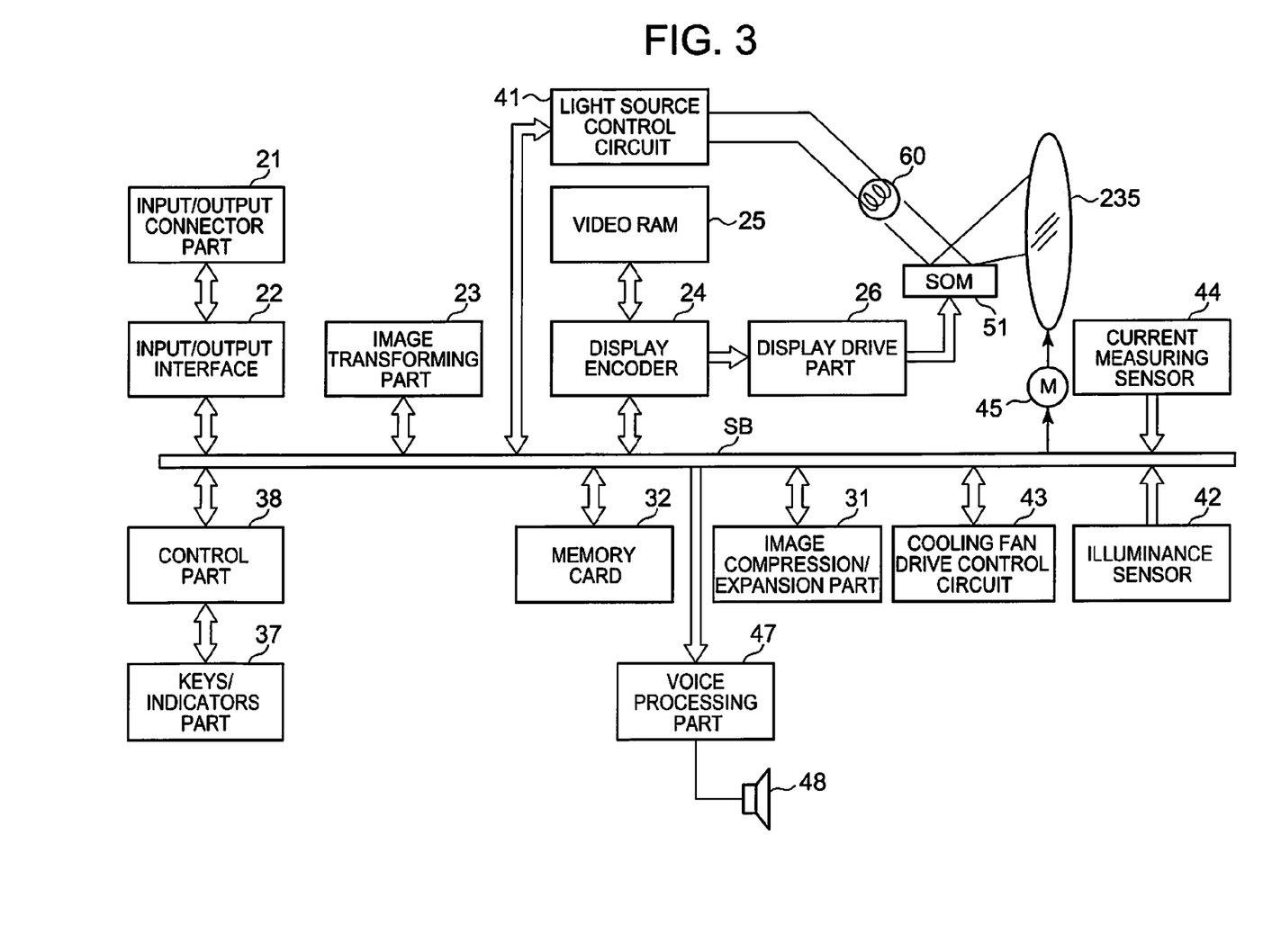
FIG. 3 is a drawing showing functional blocks of the projector according to the embodiment of the invention.

Next, a projector control unit of the projector 1 will be described by use of a function block diagram shown in FIG. 3.

The projector control unit includes a control part 38, an input/output interface 22, an image transforming part 23, a display encoder 24, a display drive part 26 and the like.

The control part 38 governs the control of respective operations of circuitries within the projector 1 and is made up of a CPU as an arithmetic unit, a ROM which stores in a fixed fashion operation programs of various types of settings and a RAM which is used as a work memory.

In The projector control unit, image signals of various standards that are inputted from the input/output connector part 21 are sent via the input/output interface 22 and a system bus (SB) to the image transforming part 23, where the image signals are transformed so as to be unified into an image signal of a predetermined format which is suitable for display. Thereafter, the image signals so transformed are outputted to the display encoder 24.

In addition, the display encoder 24 deploys the image signals that have entered it on a video RAM 25 for storage therein and generates a video signal from the contents stored in the video RAM 25, outputting the video signal so generated to the display drive part 26.

The display drive part 26 functions as a display device controller and drives a display device 51 which is a spatial optical modulator (SOM) at an appropriate frame rate in accordance with the image signal outputted from the display encoder 24.

A pencil of light rays which are emitted from the light source unit 60, that is, a pencil of light rays which are caused to converge to a predetermined surface by the light source side optical system 140 of the light source unit 60 are shone onto the display device 51 via the light guiding optical system 170, and the display drive part 26 forms an optical image by reflected light reflected at the display device 51. The image so formed can be projected on to a screen, not shown, for display via the projection side optical system.

The movable lens group 235 of the projection side optical system is driven by a lens motor 45 for zooming or focusing.

In addition, an image compression/expansion part 31 performs an operation in which when in a reproducing mode, the image compression/expansion part 31 reads out image data recorded on the memory card 32 and expands individual image data which make up a series of dynamic images frame by frame. Then, the image data is outputted to the display encoder 24 via the image transforming part 23 so as to enable the display of dynamic images on the basis of the image data stored on the memory card 32.

Operation signals generated at the keys/indicators part 37 provided on the upper case 5 of the projector housing are sent out directly to the control part 38.

Note that a voice processing part 47 is connected to the control part 38 via the system bus (SB).

This voice processing part 47 includes a sound source circuit such as a PCM sound source. When in a projection mode and a reproducing mode, the voice processing part 47 converts voice data into analog signals and drives a speaker 48 to output loudly sound or voice based on the voice data.

Additionally, the control part 38 controls a light source control circuit 41 which is configured as a light source control device.

This light source control circuit 41 controls individually the emission of light by the excitation light shining device 70, the red light source device 120 and the blue light source device 300 of the light source unit 60 so that light source light of a predetermined wavelength band which is required at the time of generating an image is emitted from the light source unit 60.

In addition, this light source control circuit 41 also functions as the motor control part which is controlled by the control part 38 so as to control the wheel motor 105 to stop rotating or start rotating.

Further, the control part 38 causes a cooling fan drive control circuit 43 to detect temperatures through a plurality of sensors which are provided at the light source unit 60 and the like so as to control the rotating speed of a cooling fan based on the results of the temperature detection.

Furthermore, the projector control unit of this embodiment includes an illuminance sensor 42 as an illuminance measuring part which measures an illuminance of light emitted from the light source unit 60 and a current measuring sensor 44 as an excitation current measuring part which measures a current which flows through the excitation light source 71.

The control part 38 controls the light source control circuit 41 based on information sent out from the illuminance sensor 42 which regards outputs of light rays of red, green and blue wavelength bands which are emitted from the light source unit 60 so as to adjust currents which are caused to flow to the excitation light sources 71, the red light source 121 and the blur light source 301.

The projector 1 of this embodiment can project an image in three projection modes such as an electric power saving projection mode, a normal projection mode and a high luminance projection mode.

The electric power saving projection mode is a mode in which an image is projected by suppressing outputs from the excitation light sources 71, the red light source 121 and the blue light source 301. The high luminance projection mode is a mode in which an image is projected by increasing outputs from the excitation light sources 71, the red light source 121 and the blue light source 301. The normal projection mode is an intermediate mode between the electric power saving mode and the high-luminance projection mode.

To realize these projection modes, the control part 38 functions as an output information storage part where information on respective outputs of the light sources 71, 121, 301 in each mode is stored in advance and a current information storage part where information on currents that are caused to flow to the light sources 71, 121, 301 in projection in each mode is stored in advance.

Then, the control part 38 controls the light source control circuit 41 to illuminate the light sources 71, 121, 301 in the plurality of luminance modes based on the pieces of information so stored in accordance with the projection mode set.

Namely, the control part 38 illuminates the light sources 71, 121, 301 in a low luminance mode when in the electric power saving mode, illuminates the light sources 71, 121, 301 in an intermediate luminance mode when in the normal projection mode, and illuminates the light sources 71, 121, 301 in the high luminance mode when in the high luminance projection mode.

The control part 38 compares output information on the individual light sources 71, 121, 301 which is sent from the illuminance sensor 42 with the output information which is stored in advance. Then, when there is a difference in output between the two pieces of output information, the control part 38 adjust the amounts of currents that are caused to flow to the individual light sources 71, 121, 301 so that the output information sent from the illuminance sensor 42 becomes the same as the output information that is stored in advance in the control part 38.

By controlling the light source control circuit 41 by the control part 38 in the way described above, even in the event that a reduction in luminance is generated in any of the light sources 71, 121, 301 due to deterioration with age, a luminance balance given to projectors when they are shipped from the factory can be maintained.

In the projector 1 of this embodiment which is configured in the way described above, the power consumption in projection needs to be reduced so as to enable a long-time battery-driven projection.

In the projector 1 of this embodiment, the luminescent wheel 101 is configured so as to be rotated in order to prevent a reduction in amount of luminescent luminous light generated by the luminescent material layer as a result of the luminescent material being deteriorated by heat or damaged by burning due to excitation light of high output being shone on to part of the luminescent material layer.

However, the driving current of the wheel motor 105 which rotationally drives the luminescent wheel 101 constitutes a large electric power consumption source.

Then, in the projector 1 of this embodiment, the electric power consumption is designed to be reduced by controlling the luminescent wheel 101 to stop rotating when the output of excitation light is not so high as to generate a heat-related deterioration such as damage by burning in the luminescent material.

In order to realize such a reduction in electric power consumption, the projector 1 of this embodiment has a control information storage part where information is stored on the control of the wheel motor 105, the motor control part which controls the wheel motor 105 based on the information stored in the control information storage unit and an excitation current measuring part which measures an amount of current which flows to the excitation light sources 71.

The control information storage part and the motor control part constitute parts of the functions of the control part 38, and the current measuring sensor 44 functions as the excitation current measuring part.

This control information storage part stores information which controls the wheel motor 105 to stop rotating in the electric power saving projection mode and the normal projection mode and to be driven rotationally in the high luminance projection mode.

The control information storage part also stores boundary driving current information which is a driving current value of the excitation light sources 71 when the state of the wheel motor 105 is switched so that the wheel motor 105 is stopped rotating or is started to be driven.

Figure 4:
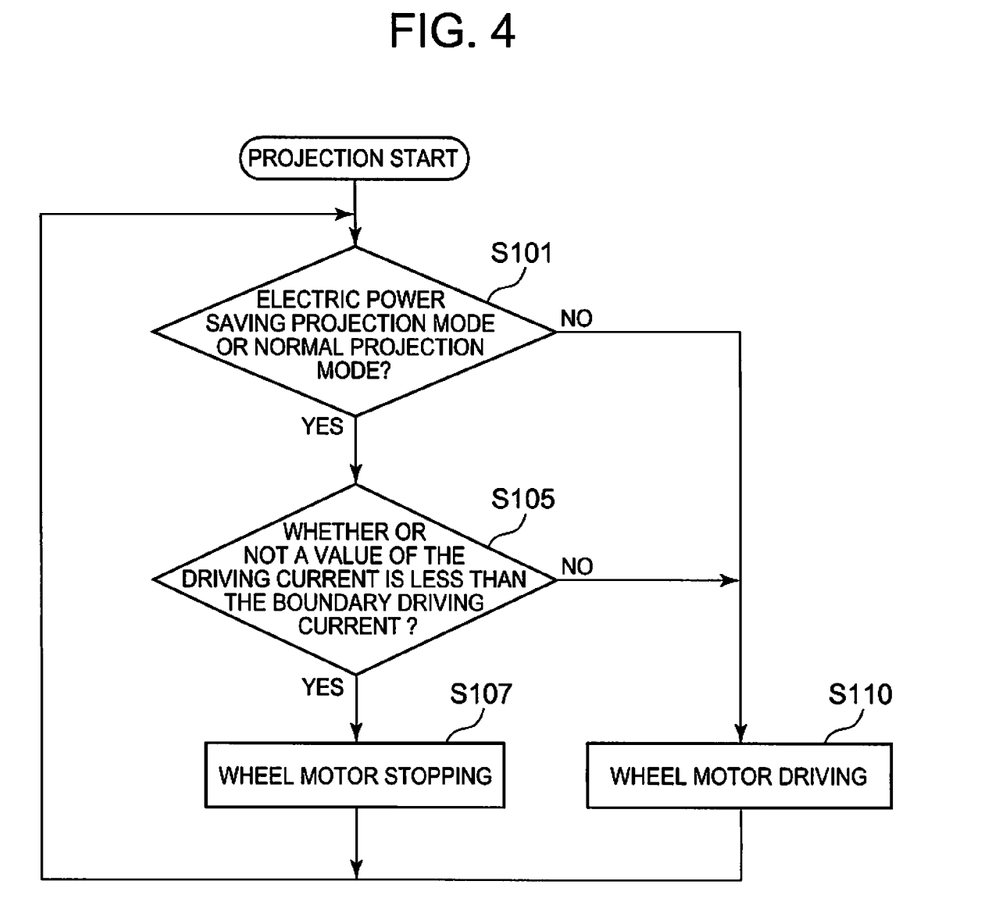
FIG. 4 is a flowchart showing a control flow regarding the control of a wheel motor of the projector according to the embodiment of the invention.

The motor control part controls the wheel motor 105 based on a control flow shown in FIG. 4.

Namely, the motor control part firstly executes a projection mode determination operation (step S101) to determine whether the projection mode is the electric power saving projection mode or the normal projection mode.

If the motor control part determines in the projection mode determination operation (step S101) that the projection mode is either the electric power saving projection mode or the normal projection mode, the motor control part executes a driving current determination operation to determine whether or not a value of the driving current of the excitation light sources 71 is less than the boundary driving current stored in the control information storage part (step S105).

If the motor control part determines in the driving current determination operation (step S105) that the value of the driving current is less than the boundary driving current, the motor control part executes a motor stopping operation (step S107) to stop the wheel motor 105.

On the other hand, if the motor control part determines in the projection mode determination operation (step S101) that the projection mode is the high luminance projection mode and determines in the driving current determination operation (step S105) that the value of the driving current is equal to or larger than the boundary driving current, the motor control part executes a motor driving operation (step S110) to drive the wheel motor 105.

Then, after having executed the motor stopping operation (step S107) and the motor driving operation (step S110), the motor control part executes the operations repeatedly until the end of projection.

Namely, in the projector 1 of this embodiment, the wheel motor 105 is controlled in accordance with the value of the driving current of the excitation light sources 71 while the wheel motor 105 is controlled in accordance with the projection mode.

In this way, in the projector 1 of this embodiment, the wheel motor 105 is controlled while verifying both the projection mode and the driving current.

This is because, in the projector 1 of this embodiment, since the respective driving currents of the light sources 71, 121, 301 are controlled based on output information measured by the illuminance sensor 42 in the way described above, even in the electric power saving projection mode or the normal projection mode, there occurs a case where the driving current of the excitation light sources 71 which is controlled based on the information from the illuminance sensor 42 or the outputs of the excitation light sources 71 become high, and as this occurs, there are possibilities that a deterioration by heat such as burning is generated in the luminescent material.

Namely, by controlling the wheel motor 105 while verifying both the projection mode and the driving current, the deterioration of the luminescent material by heat such as the damage of the luminescent material by burning can be prevented in an ensured fashion.

The green luminescent material used in this embodiment burns in 20 milli-seconds when excitation light whose output is 5.48 W/mm$^2$ (5.48 Watt per square millimeter) is shone on thereto, and the green luminescent material does not burn when excitation light whose output is 1.62 W/mm$^2$ (1.62 Watt per square millimeter) is shone on thereto.

Consequently, the luminescent wheel 101 needs to be rotated in such a state that at least a driving current with which a laser beam whose output is 5.48 W/mm$^2$ (5.48 watt per square millimeter) is outputted is caused to flow to the excitation light sources 71. On the other hand, the luminescent wheel 101 can be stopped rotating in such a state that a driving current with which a laser bean whose output is 1.62 W/mm$^2$ (1.62 Watt per square millimeter) is outputted is caused to flow to the excitation light sources 71.

According to the projector 1 of this embodiment, by including the motor control part which controls the wheel motor 105 to stop rotating or to be driven rotationally within an extent that the deterioration of the luminescent material by heat such as the damage thereof by burning is not generated, the power consumption can be suppressed while preventing the deterioration of the luminescent material by heat such as the damage thereof by burning.

Namely, by stopping the rotation of the wheel motor 105 in projection, the driving current of the wheel motor 105, which constitutes the large electric power consumption source, can be reduced, and this enables the extension of a projection time by electric power given by the battery 55 in projection, thereby making it possible to provide the projector which is easy to be handled and which is small in size.

In addition, according to the projector 1 of this embodiment, by including the excitation current measuring part and the control information storage part, the wheel motor 105 can be controlled to stop rotating or to be driven rotationally in accordance with the value of driving current which flows to the excitation light sources 71, thereby making it possible to suppress the power consumption while preventing the deterioration of the luminescent material by heat such as the damage thereof by burning in an ensured fashion.

Further, by storing the boundary driving current information in advance in the control information storage part, controlling the wheel motor 105 to stop rotating or to be driven rotationally can easily be realized by the motor control part, thereby making it possible to provide the projector 1 which reduces the power consumption while preventing the deterioration of the luminescent material by heat such as the damage thereof by burning.

By controlling the wheel motor 105 to stop rotating or to be driven rotationally in accordance with the projection mode, the reduction in power consumption can easily be realized in every projector 1 which includes a plurality of projection modes.

In this embodiment, while the configuration is adopted in which the boundary driving current information is stored in the control information storage part so that the wheel motor 105 is controlled to stop rotating or to be driven rotationally while verifying both the projection mode and the boundary driving current information, a configuration can be adopted in which information on the value of driving current which flows to the excitation light sources 71 and the rotation speed of the luminescent wheel 101 is stored in the control information storage part so that when the value of driving current is large, the rotational speed of the luminescent wheel 101 is made fast, whereas when the value of driving current is small, the rotational speed of the luminescent wheel 101 is slowed or the luminescent wheel 101 is stopped rotating.

Even in the event that the configuration is adopted in which the rotational speed of the luminescent wheel 101 is controlled in an analog fashion in accordance with the amount of driving current which flows to the excitation light sources 71, the power consumption necessary to drive the wheel motor 105 can be reduced, thereby making it possible to provide the projector which enables a long-time projection by electric power given by the battery 55 and which is small in size.

A configuration may also be adopted in which the boundary output information which is information on the outputs of the excitation light sources 71 and which constitutes a boundary where the wheel motor 105 is stopped rotating or is started to be driven rotationally is stored in the control information storage part so that the wheel motor 105 is controlled based on information on the outputs of the excitation light sources 71 which are sent out from the illuminance sensor 42 as the aforesaid illuminance measuring part.

Namely, the configuration can also be adopted in which the wheel motor 105 is controlled by comparing the information on the outputs of the excitation light sources 71 which is sent out from the illuminance sensor 42 with the boundary output information.

Also in the event that the configuration is adopted in which the wheel motor 105 is controlled based on the outputs of the excitation light sources 71, as with the embodiment described above, the power consumption necessary to drive the wheel motor 105 can be reduced, while preventing the deterioration of the luminescent material by heat such as the damage thereof by burning, thereby making it possible to provide the projector which enables a long-time projection by electric power given by the battery 55 and which is small in size.

In the embodiment described above, while only the light of green wavelength band is generated by use of the luminescent wheel 101, also in a light source unit including a luminescent wheel on which a luminescent material which generates light of red or blue wavelength band is laid circumferentially, the power consumption can be reduced by a similar motor control.

Namely, in an every type of illumination unit or light source unit including a luminescent wheel and a wheel motor, the power consumption can be reduced by use of a similar configuration.

Namely, the invention is not limited to the embodiment and the modifications thereto and hence can be altered or improved variously without departing from the spirit and scope of the invention.

What is claimed is:

1. A light source unit comprising:
   an excitation light source;
   a luminescent wheel on which a luminescent material layer is laid circumferentially, wherein the luminescent material layer becomes luminous by using light emitted from the excitation light source as excitation light;
   a wheel motor for driving the luminescent wheel; and
   a motor control part which determines whether to stop or drive the wheel motor in a state in which excitation light is shone onto the luminescent material layer by the excitation light source.

2. A light source unit as set forth in claim 1, further comprising:
   an excitation current measuring part which measures a driving current which flows to the excitation light source; and
   a control information storage part which stores information regarding a relationship between a value of driving current which flows to the excitation light source and stopping or driving of the wheel motor;
   wherein the motor control part determines whether to stop or drive the wheel motor based on the information stored in the control information storage part by comparing a value of driving current which is sent out from the excitation current measuring part with the information stored in the control information storage part.

3. A light source unit as set forth in claim 2, wherein boundary driving current information which is information on a boundary driving current flowing to the excitation light source which constitutes a condition based on which the wheel motor is stopped or driven, is stored in the control information storage part; and
   wherein the motor control part determines that the wheel motor be stopped when a value of driving current which flows through the excitation light source is less than the boundary driving current and determines that the wheel motor be driven when the value of driving current which flows through the excitation light source is equal to or larger than the boundary driving current.

4. A light source unit as set forth in claim 3, wherein the light source unit has a plurality of luminance modes in which a luminance of emitted light source light differs; and
   wherein the motor control part determines whether to stop or drive the wheel motor in accordance with the luminance modes.

5. A light source unit as set forth in claim 2, wherein information on a value of driving current which flows to the excitation light source and a rotational speed of the luminescent wheel is stored in the control information storage part; and
   wherein the motor control part controls the wheel motor so that the luminescent wheel rotates at a rotational speed which matches a value of driving current which flows through the excitation light source.

6. A light source unit as set forth in claim 2, wherein the light source unit has a plurality of luminance modes in which a luminance of emitted light source light differs; and
   wherein the motor control part determines whether to stop or drive the wheel motor in accordance with the luminance modes.

7. A light source unit as set forth in claim 1, further comprising:
   a red light source which emits light of a red wavelength band;
   a blue light source which emits light of a blue wavelength band; and
   a light source control part which controls the excitation light source, the red light source, and the blue light source in a time sharing manner.

8. A light source unit as set forth in claim 7, further comprising:
   an illuminance measuring part which measures an illuminance of light emitted from the light source unit;
   an output information storage part which stores in advance information on outputs from the light source unit; and
   a current control part which compares information on outputs which is sent out from the illuminance measuring part with the information on the outputs which is stored in advance in the output information storage part and adjusts a current which flows to the light source unit so that the information on the outputs which is sent out from the illuminance measuring part coincides with the information on the outputs which is stored in advance in the output information storage part.

9. A light source unit as set forth in claim 1, further comprising:
   an illuminance measuring part which measures an illuminance of light emitted from the light source unit;
   an output information storage part which stores in advance information on outputs from the light source unit; and
   a current control part which compares information on outputs which is sent out from the illuminance measuring part with the information on the outputs which is stored in advance in the output information storage part and adjusts a current which flows to the light source unit so that the information on the outputs which is sent out from the illuminance measuring part coincides with the information on the outputs which is stored in advance in the output information storage part.

10. A light source unit as set forth in claim 1, wherein the light source unit has a plurality of luminance modes in which a luminance of emitted light source light differs; and
    wherein the motor control part determines whether to stop or drive the wheel motor in accordance with the luminance modes.

11. A light source unit as set forth in claim 1, wherein the luminescent wheel emits light of a green wavelength band by receiving the light emitted from the excitation light source.

12. A projector comprising:
    a light source unit;
    a display device;
    a light guiding optical system which guides light emitted from the light source unit to the display device; and
    a projection side optical system which projects projection light of the optical image generated in the display device;
    wherein the light source unit is that as set forth in claim 1.

* * * * *